United States Patent [19]

Ohya et al.

[11] 4,154,778
[45] May 15, 1979

[54] PROCESS FOR PRODUCING A GRAFT POLYMER

[75] Inventors: Masaki Ohya; Masayasu Suzuki; Akio Kobayashi, all of Iwaki, Japan

[73] Assignee: Kureha Kagaku Kogyo Kabushiki Kaisha, Japan

[21] Appl. No.: 900,584

[22] Filed: Apr. 27, 1978

Related U.S. Application Data

[63] Continuation of Ser. No. 744,446, Nov. 23, 1976, abandoned.

[30] Foreign Application Priority Data

Nov. 27, 1975 [JP] Japan .................. 50-141112

[51] Int. Cl.$^2$ .......................................... C08F 279/02
[52] U.S. Cl. ................................................. 260/879
[58] Field of Search ..................................... 260/879

[56] References Cited
U.S. PATENT DOCUMENTS

| | | | |
|---|---|---|---|
| 3,880,951 | 4/1975 | Ooya | 260/879 |
| 3,950,454 | 4/1976 | Hensley | 260/879 |

Primary Examiner—Paul R. Michl
Attorney, Agent, or Firm—Wenderoth, Lind & Ponack

[57] ABSTRACT

A process for producing a graft polymer possessing a low gas-permeability and an excellent impact resistance and thermal stability which comprises the steps of:

first graft-polymerizing in emulsion 5 to 40 parts by weight of (A) a monomeric mixture comprising 30 to 70% by weight of acrylonitrile and 30 to 70% by weight of at least one acrylic ester having the following formula:

$CH_2=CHCOOR_1$ wherein $R_1$ represents an alkyl group having from 1 to 4 carbon atoms, in the presence of 2 to 30 parts by weight of (B) a trunk copolymer prepared by copolymerizing 50 to 90% by weight of 1,3-butadiene, 10 to 50% by weight of at least one acrylic or methacrylic ester having the following formula:

$CH_2=CR_3COOR_2$ wherein $R_2$ represents an alkyl group having from 1 to 8 carbon atoms and $R_3$ represents a hydrogen atom or a methyl group, and 0 to 15% by weight of styrene to form a first branch polymer; and then graft-polymerizing in emulsion 40 to 90 parts by weight of (C) a monomeric mixture comprising 50 to 85% by weight of acrylonitrile and 15 to 50% by weight of at least one acrylic ester having the following formula:

$CH_2=CHCOOR_4$ wherein $R_4$ represents an alkyl group having from 1 to 4 carbon atoms, in the presence of 10 to 60 parts by weight of the first branch polymer prepared in the preceding step, to form a second branch polymer and wherein $2.0 \leq \delta P_2 - \delta P_1 \leq 2.7$ $0.4 \leq \delta P_3 - \delta P_2 \leq 0.8$ wherein $\delta P_1$, $\delta P_2$ and $\delta P_3$ are solubility parameters of the trunk polymer, the first branch polymer and the second branch polymer, respectively, expressed in terms of $(cal/cc)^{\frac{1}{2}}$.

7 Claims, No Drawings

PROCESS FOR PRODUCING A GRAFT POLYMER

This is a continuation of application Ser. No. 744,446, filed Nov. 23, 1976, now abandoned.

BACKGROUND OF THE INVENTION

1. Field of the Invention

The present invention relates to a process for producing a resin possessing low gas-permeability and excellent impact resistance and thermal stability, which comprises graft polymerizing, in two stages, a monomeric mixture of acrylonitrile and acrylic ester in the presence of a copolymer of 1,3-butadiene and acrylic (or methacrylic) ester.

2. Prior Art

The resin composition prepared according to the process of the present invention has the following advantageous characteristics.

(1) A shaped article formed from the resin composition has excellent impact resistance. Particularly, the resin composition of the present invention always makes it possible to produce a shaped article having high impact strength under any processing conditions.

(2) The resin composition can be easily formed into a shaped article which has good thermal stability and excellent processing property and is free of color. Particularly, due to no evolution of an offensive smell during the processing, the resin composition is suitable as a material for packaging foodstuffs. When a shaped article made from this composition is used for packaging foodstuffs, there is neither absorption of the smell of the packaging material into the foodstuffs nor change in the taste thereof.

(3) A shaped article made from the resin composition is glossy, colorless, and transparent and has a beatiful appearance.

(4) A shaped article made from the resin composition has very low permeability to gases such as carbon dioxide, oxygen and steam.

Heretofore, in order to improve the impact resistance of an acrylonitrile-based resin which is intended to be used as a gas barrier, there has been practiced a process which comprises graft-polymerizing a relatively large amount of monomers comprising mainly acrylonitrile in the presence of a relatively small amount of a rubbery trunk polymer.

However, the graft polymer obtained according to this process exhibits only a relatively low impact resistance and does not satisfactorily exhibit the intended properties. We have studied the possible causes for this. As a result, we have found that there is apparently present a certain relationship between the compatibility between the rubbery trunk polymer and the branch polymer selected and the properties of the resulting graft polymer and that the compatibility between the two polymers largely contributes to the properties of the graft polymer.

More specifically, as the compatibility between the rubbery trunk polymer and the branch polymer is poor, the degree of grafting of the branch polymer is low, and the resulting graft polymer has a non-uniform shape in the particles thereof, for which reason the graft polymer exhibits only a low impact resistance. That is, in the case where a monomeric mixture (for forming a branch polymer) consisting mainly of acrylonitrile is polymerized in the presence of particles of a trunk polymer consisting mainly of a conjugated diene, the shape and nature of the resulting graft polymer depend upon the degrees of compatibility between the trunk polymer and the branch polymer.

When the latex particles of a graft polymer obtained from the emulsion polymerization of the trunk polymer and the branch polymer of various degrees of compatibility thereof were examined under an electron microscope and the shapes of these particles were comparatively observed, it was found that in the case of a good compatibility the added monomers form a shell uniformly covering the surface of a core consisting of a spherical trunk polymer, that is, a graft polymer having a uniform coating is produced, while in the case of a poor compatibility the added monomers non-uniformly coat the surface of a spherical trunk polymer whereby a distorted shell is formed thereon, that is, a graft polymer having a non-uniform coating is produced.

It has also been found that a graft polymer comprising the trunk polymer with the uniform coating formed thereon has higher degree of grafting and excellent impact resistance and thermal stability, while a graft polymer comprising the trunk polymer with the non-uniform coating formed thereon is inferior to the former polymer with respect to these properties.

That is, the latter polymer has lower impact resistance and is not satisfactory with respect to practical strength. Further, it tends to be colored yellow or brown during the processing of its melt, and at the same time it gives off an offensive odor.

If a shaped article made from a graft polymer of such poor quality were to used to package foodstuffs, cosmetics, medical supplies and the like, the offensive odor of the article would infiltrate the content of the package, thereby reducing the value thereof to great extent, which would be unfavorable from the standpoint of practical use. However, with a graft polymer consisting mainly of acrylonitrile which is mainly intended for affording gas barrier property, the difference in compatibility between the trunk polymer and the branch polymer is, by itself, determined depending upon the composition of the two materials. Further, another matter which should be taken into consideration is that the composition of the two materials cannot be changed to a great extent in order to obtain a resin having the objective property. That is, in order that a graft polymer consisting of acrylonitrile possess the desired gas barrier property, the branch polymer constituting the major portion of the resin must have a composition such that the predominant portion of the component is acrylonitrile for the purpose of decreasing the gas permeability of the resin. Also, use is made of a rubber copolymer consisting mainly of a conjugated diene as a trunk polymer for the purpose of imparting impact resistance to the resin. In this case, a predominant amount of the conjugated diene is used so as to provide the desired impact resistance. A combination of a rubber polymer component and a grafting monomer component is thus selected so that the desired properties will be developed in the resultant graft polymer.

Accordingly, since compositions of the components are restricted within a certain range in order to attain desired properties, it is impossible to bring the compatibilities of both the components in complete agreement, and the difference cannot be disregarded in order to attain desirable properties such as impact resistance.

SUMMARY OF THE INVENTION

It is an object of the present invention to provide a process for producing graft polymers endowed with excellent impact resistance and processability by graft-polymerizing a monomer mixture onto a rubber polymer.

A further object of the present invention is to provide a process for producing graft polymers endowed with improved impact resistance and processability from a given monomeric mixture to be graft-polymerized onto the rubber polymer.

It has now been found, in accordance with the present invention, that presence of a first branch polymer having a good compatibility between it and the rubbery trunk polymer and between it and a second branch polymer is very useful.

Good results can thus be obtained by carrying out at least one addition of a monomeric mixture (i) having a good compatibility with a rubbery trunk polymer and a second branch polymer of another monomeric mixture (ii) to the rubbery trunk polymer, polymerizing the mixture (i) and subsequently polymerizing the other branch polymer (ii) with the preceding branch polymer, that is, by carrying out a multiple stages of graft polymerization comprising polymerizing two or more grafting components onto the trunk polymer in two or more stages.

The monomeric mixture (ii) is preferably the same as the monomeric mixture (i) except for the ratio of the components of the mixture. Accordingly, in the preferable embodiment of the present invention, the graft polymerization is carried out by dividing the grafting monomers into at least two portions and graft polymerizing each of the portions onto the rubbery trunk polymer in at least two stages. In this case, the branch polymer added in the first stage of the graft polymerization process is characterized by having a compatibility between it and the second branch polymer and between it and the rubbery trunk polymer. The acrylonitrile content in the first monomeric mixture (i) is preferably lower than that in the second monomeric mixture (ii).

In this connection, when the difference in solubility parameter δ between the respective components in question is used as a measure of compatibility, it has been found that the degree of compatibility between the respective components can be represented in a relatively quantitative manner.

As the solubility parameters of polymers, use can be made of those values set forth in reference material, for example, Polymer Hand Book J. Brandrup/E. H. Immergent, Interscience Publishers, 1966, Page 341–368. The solubility parameter value of a branch polymer can be calculated from the contribution to the branch polymer of the constituent monomers of the branch polymer as homopolymers thereof, and accordingly is a sum of products of (a solubility parameter value of the homopolymer of the monomer)×(concentration in percent by weight of the polymerized monomer in question in the branch polymer).

A part of the solubility parameter values which are adopted in the present invention is shown below.

| Solubility Parameter Values of Polymers | |
|---|---|
| Polymer | Solubility parameter values δ (cal/cc)$^{\frac{1}{2}}$ |
| polyacrylonitrile | 12.50 |

-continued

| Solubility Parameter Values of Polymers | |
|---|---|
| Polymer | Solubility parameter values δ (cal/cc)$^{\frac{1}{2}}$ |
| polymethyl acrylate | 10.10 |
| polyethyl acrylate | 9.35 |
| polybutyl acrylate | 8.8 |
| polymethyl methacrylate | 9.5 |
| polystyrene | 9.10 |
| polybutadiene | 8.40 |

The solubility parameters are selected so that:

$$2.0 \leq \delta P_2 - \delta P_1 \leq 2.7$$

$$0.4 \leq \delta P_3 - \delta P_2 \leq 0.8$$

wherein $\delta P_1$, $\delta P_2$ and $\delta P_3$ are solubility parameters of the trunk polymer, the first branch polymer and the second branch polymer, respectively, expressed in terms of $(cal/cc)^{\frac{1}{2}}$.

In accordance with the present invention, there is thus provided a process for producing a graft polymer which comprises the steps of:

graft polymerizing 5 to 40 parts by weight of (A) a monomeric mixture comprising 30 to 70% by weight of acrylonitrile and 30 to 70% by weight of at least one acrylic ester having the following formula:

wherein $R_1$ represents an alkyl group having from 1 to 4 carbon atoms, in the presence of 2 to 30 parts by weight of (B) a copolymer prepared by copolymerizing 50 to 90% by weight of 1,3-butadiene, 10 to 50% by weight of at least one acrylic (or methacrylic) ester having the following formula:

wherein $R_2$ represents an alkyl group having from 1 to 8 carbon atoms and $R_2$ represents a hydrogen atom or a methyl group, and 0 to 15% by weight of styrene; and graft polymerizing 40 to 90 parts by weight of (C) a monomeric mixture comprising 50 to 85% by weight of acrylonitrile and 15 to 50% by weight of at least one acrylic ester having the following formula:

wherein $R_4$ represents an alkyl group having from 1 to 4 carbon atoms, with 10 to 60 parts by weight of the first graft polymer prepared in the preceding step.

DETAILED DESCRIPTION

The copolymerization and graft polymerization in the above process may be carried out by any known method such as emulsion polymerization, suspension polymerization, solution polymerization or the like. However, the emulsion polymerization is the easiest to carry out and is thus suitable for the production of the graft polymer of the present invention.

The trunk polymer used in the above mentioned two-stage graft polymer is a copolymer of 1,3-butadiene and a monomer copolymerizable therewith. The copolymerizable monomer is a monomer of at least one acrylic ester such as, for example, methyl acrylate, ethyl acrylate, propyl acrylate, butyl acrylate, 2-ethylhexyl acrylate, methyl methacrylate, ethyl methacrylate, propyl methacrylate, butyl methacrylate and hexyl methacrylate and styrene. The 1,3-butadiene comprises 50 to 90% by weight of the 1,3-butadiene copolymer. When the 1,3-butadiene is less than 50% by weight, the final graft polymer cannot possess a satisfactory impact resistance. The styrene is not always necessary. However, if a monomer whose polymer has a low refractive index is used as a comonomer copolymerizable with the 1,3-butadiene, the resulting shaped article will be opaque. In order to avoid this problem, the styrene is added. When the styrene exceeds 15% by weight, the resulting 1,3-butadiene copolymer has a refractive index higher than that of a polymer of the branch polymer and becomes opaque. Accordingly, the styrene in excess of 15% by weight is unfavourable.

The 1,3-butadiene copolymer as the substrate copolymer is used in a quantity of 2 to 30 parts by weight. When the 1,3-butadiene copolymer is used in a quantity of less than 2 parts by weight, it is impossible to impart a satisfactory impact resistance to the final graft polymer. On the other hand, in the case where the quantity of the 1,3-butadiene copolymer is greater than 30 parts by weight, the gas permeability of the resultant graft polymer is higher, and the creep resistance thereof deteriorates. 5 to 40 parts by weight of a monomer mixture having a composition described hereinbelow is added to 2 to 30 parts by weight of the 1,3-butadiene copolymer to effect a first graft polymerization.

The monomer mixture comprises 30 to 70% by weight of acrylonitrile and 30 to 70% by weight of at least one monomer selected from the group consisting of methyl acrylate, ethyl acrylate, propyl acrylate and butyl acrylate. When the acrylonitrile contained in the monomer mixture is greater than 70% by weight, the compatibility between the branch polymer and the 1,3-butadiene copolymer which is the trunk polymer is reduced, whereby a graft polymer having poor impact resistance and thermal stability is obtained. On the other hand, in the case where the acrylonitrile contained in the monomer mixture is less than 30% by weight, the compatibility between the first branch polymer and a second branch polymer is reduced, whereby a graft polymer having poor impact resistance and thermal stability is obtained. That is, it is necessary that the first branch polymer have a good compatibility with the trunk polymer and moreover with the second branch polymer. When the first branch polymer is used in a quantity above 40 parts by weight, the gas permeability of the resultant polymer is undesirably increased. On the other hand, in the case where the quantity of the first grafting component used is less than 5 parts by weight, the compatibility with the trunk polymer and moreover, with the second branch polymer is not satisfactorily enhanced, and the resulting graft polymer is inferior in both impact resistance and thermal stability.

Then, 40 to 90 parts by weight of a monomer mixture having a composition described hereinbelow is added to 10 to 60 parts by weight of the first branch polymer to effect a second graft polymerization. The monomer mixture comprises 50 to 85% by weight of acrylonitrile and 15 to 50% by weight of at least one monomer selected from the group consisting of methyl acrylate, ethyl acrylate, propyl acrylate and butyl acrylate. When the acrylonitrile present in the monomer mixture is above 85% by weight, a shaped article made from the resulting graft polymer has poor thermal stability and is colored. On the other hand, in the case where the quantity of acrylonitrile used is less than 50% by weight, the gas permeability of the resultant graft polymer is increased and, thus, the objective product cannot be obtained.

In order to indicate more fully the nature and utility of this invention, the following specific examples of practice are set forth, it being understood that these examples are presented as illustrative only and that they are not intended to limit the scope of the invention. In these examples, quantities given in percentages and parts are all by weight.

EXAMPLE 1

The ingredients indicated below were charged into an autoclave and stirred at a temperature of 40° C. for 46 hours to produce a latex having a particle size of about 0.2μ in a yield of 99%.

| (A) | 1,3-butadiene | 30 parts |
|---|---|---|
| | Methyl methacrylate | 20 parts |
| | tert.-dodecyl mercattan | 0.25 part |
| | Diisopropylbenzenehydroperoxide | 0.04 part |
| | Rongalit | 0.025 part |
| | Disodium ethylenediamine-tetraactate | 0.0005 part |
| | Sodium dodecylbenzenesulfonate | 0.1 part |
| | Water | 150 parts |

The polymer thus obtained and a solubility parameter value $\delta$ of 8.8 as calculated from a geometrical average of the solubility parameter of polybutadiene and polymethyl methacrylate, respectively.

Then, to the latex of (A) were added the following ingredients and the resulting mixture was stirred for 1 hour.

| (B) | Sodium dodecylbenzenesulfonate | 0.15 part |
|---|---|---|
| | Water | 100 parts |

Subsequently, the ingredients indicated below were added to the stirred mixture and the atmosphere within the autoclave was completely displaced with nitrogen. Thereafter, the content within the autoclave was stirred at a temperature of 40° C. for 12 hours to produce a latex in a yield of 96%.

| Acrylonitrile | 22.5 parts |
|---|---|
| Methyl acrylate | 27.5 parts |
| n-dodecyl mercaptan | 0.6 part |
| Diisopropylbenzenehydroperoxide | 0.1 part |
| Rongalit | 0.05 part |
| FeSO$_4$ . 7H$_2$O | 0.002 part |
| Disodium ethylenediaminetetraacetate | 0.003 part |
| Water | 50 parts |

The grafted portion of the latex had a solubility parameter value $\delta$ of 11.2.

Then, the following ingredients were charged into an autoclave, and the pH of the content was adjusted to 5.0 by the use of an aqueous solution of sulphuric acid.

| First graft polymer latex as prepared above (as a solid content) | 20 parts |
|---|---|
| NaHSO$_3$ | 0.008 part |
| Sodium dodecylbenzenesulfonate | 0.25 part |
| Water | 240 parts |

Thereafter, the following ingredients were added to the resulting mixture:

| | |
|---|---|
| Acrylonitrile | 60 parts |
| Methyl acrylate | 20 parts |
| n-dodecyl mercaptan | 2.4 part |
| Potassium persulfate | 0.032 part |

The atmosphere within the autoclave was completely displaced with nitrogen, and the content of the autoclave was stirred at a temperature of 50° C. for 22 hours to produce a latex. At the end of that time, the latex thus prepared was removed from the autoclave and the residual monomers were separated from the latex. The resultant latex was salted out with a 2% aqueous solution of aluminum sulfate, and the pH of the latex was adjusted to 7.0 by the use of an aqueous solution of sodium pyrophosphate. Following this procedure, the latex was heated to 70° C., after which the latex was filtered off, washed with water, and dried. A graft polymer in the form of a white powder was obtained in a yield of 96%. The second grafted portion of the polymer had a solubility parameter value $\delta$ of 11.9.

The graft polymer has excellent properties as indicated in Table 1.

Table 1

| Properties of graft polymer of this invention | |
|---|---|
| Izod impact strength (kg.cm/cm$^2$) notched) (23° C.) | MD‖ 43<br>MD⊥ 26 |
| Thermal stability | colorless |
| Odor | not detected |
| Degree of grafting | 117 |
| Melt viscosity (poise) (200° C.) | 2.5 × 10$^4$ |
| The oxygen permeablity at 20° C. was $2.6 \times 10^{-13} \left( \frac{cc \cdot cm}{cm^2 \cdot sec \cdot cmHg} \right)$. | |

The tests for measuring the properties shown in Table 1 were carried out in the following manner. (1) Izod impact strength: a resin is kneaded on a roll at a temperature of 165° C. for 3 minutes, and the rolling direction of the kneaded sheet is arranged in the same direction. Then, the sheet was pressed at a temperature of 200° C. under a pressure of 150 kg/cm$^2$ for 10 minutes in such a manner that the sheet does not flow during the melting thereof under heat. When the pressed sheet is formed into a sample piece in the form of a long strip, the sample piece is notched in the same direction as or in the perpendicular direction to the machine direction (the rolling direction) and the longitudinal axis of the strip. The former case of the same direction as the machine direction (herein abridged as MD) and the notch is represented as MD ‖ and in the case of the perpendicular direction of MD and the notch, this is represented as MD ⊥.

(2) Thermal stability: a resin is pressed at a temperature of 200° C. under a pressure of 150 kg/cm$^2$ for 10 minutes to form a sheet of 1-mm thickness. The sheet is observed with the naked eye for degree of coloring.

(3) Odor: the sample resin is kneaded on a roll at a temperature of 165° C. for 3 minutes and then pressed at a temperature of 200° C. under a pressure of 150 kg/cm$^2$ for 2 minutes to form a sheet of 1-mm thickness. Six sheets each measuring 4 cm×6 cm are immersed in a cylinder equipped with a common stopper and containing 200 ml. of distilled water and are subjected to extraction at a temperature of 60° C. for 24 hours. The odor is determined depending upon the degree of odor of the extracting solution. The determination of the odor is based on the odor of distilled water maintained under the same conditions.

(4) Degree of grafting: 0.5 g of the graft polymer sample was immersed in 30 ml. of acetonitrile (CH$_3$CN) and maintained with occasional shaking at room temperature for 40 hours. At the end of that time, the remelting solution is separated into the supernatant liquid and the precipitate portion by means of a super-centrifugal separation. Then, the degree of grafting is calculated by the following equation:

$$\text{Degree of grafting} = \frac{\text{Weight of portion undissolved in CH}_3\text{CN}) - (\text{Weight of trunk polymer})}{\text{Weight of trunk polymer}} \times 100$$

(5) Melt viscosity: the melt viscosity is determined under a pressure of 150 kg/cm$^2$ by Kohka's flow tester having a nozzle measuring 1.0 $\phi$ mm×10.0 mm.

EXAMPLE 2

(Comparison Example)

According to the same recipe as described in (A) of Example 1, a 1,3-butadiene copolymer latex having the same composition as in Example 1 was prepared.

Then, the ingredients indicated below were charged into an autoclave and the pH of the content was adjusted to 5.0 with the use of an aqueous solution of sulfuric acid.

| | |
|---|---|
| 1,3-butadiene-methyl methacrylate copolymer latex (as a solid content) | 10 parts |
| Na HSO$_3$ | 0.009 part |
| Sodium dodecylbenzenesulfonate | 0.28 part |
| Water | 270 parts |

Then, to the resulting mixture was added the following ingredients and the atmosphere within the autoclave was displaced with nitrogen, after which the mixture was stirred at a temperature of 50° C. for 22 hours to produce a latex.

| | |
|---|---|
| Acrylonitrile | 67.5 parts |
| Methyl acrylate | 22.5 parts |
| n-dodecyl mercaptan | 2.7 part |
| Potassium persulfate | 0.036 part |

The yield of the graft polymer obtained as in Example 1 was 96%. The branch polymer of the graft polymer had a solubility parameter value $\delta$ of 11.9. The properties of the graft polymer was determined under the same conditions as those described in Example 1. The results are shown in Table 2.

Table 2

| Properties of graft polymer of Comparison Example | |
|---|---|
| Izod impact strength (kg.cm/cm$^2$)<br>(notched)   (23° C.) | MD ‖ 5.1<br>MD ⊥ 2.9 |
| Thermal stability | yellow |
| Odor | offensive |
| Degree of grafting | 57 |
| Melt viscosity (poise) (200° C.) | 3.3 × 10$^4$ |

As is apparent from Example 1, the graft polymer obtained by the process of the present invention has a higher izod impact strength and superior thermal stability and odor property as compared with the graft polymer obtained by the process of Comparison Example 1. Also, as can be seen from the numerical values of the degree of grafting, the process of the present invention makes it possible to produce a graft polymer in which the branch polymer is satisfactorily grafted onto the trunk polymer.

EXAMPLE 3-12

The effect of the composition of a first branch polymer on the final graft polymer was examined under the same polymerization conditions as those described in Example 1. The compositions of the trunk polymer, the first branch polymer and the second branch polymer are shown in Table 3.

| | | Composition of trunk polymer | | | Composition of first branch polymer | | | (*4) | Composition of second branch polymer | | | (*5) |
|---|---|---|---|---|---|---|---|---|---|---|---|---|
| Example No. | | But | MMA | $\delta P_1$(*1) | AN | acrylate | $\delta P_2$(*2) | $\delta P_2-\delta P_1$ | AN | MA | $\delta P_3$(*3) | $\delta P_3-\delta P_2$ |
| 3 | Comparison Example | 6 | 4 | 8.8 | 7 | MA 3 | 11.8 | 3.1 | 60 | 20 | 11.9 | 0.1 |
| 4 | This invention | 6 | 4 | 8.8 | 6 | " 4 | 11.5 | 2.7 | 60 | 20 | 11.9 | 0.4 |
| 5 | " | 6 | 4 | 8.8 | 5 | " 5 | 11.3 | 2.5 | 60 | 20 | 11.9 | 0.6 |
| 6 | " | 6 | 4 | 8.8 | 4 | " 6 | 11.1 | 2.3 | 60 | 20 | 11.9 | 0.8 |
| 7 | " | 6 | 4 | 8.8 | 3 | " 7 | 10.8 | 2.0 | 60 | 20 | 11.9 | 1.1 |
| 8 | " | 6 | 4 | 8.8 | 2. | " 2.5 | 11.3 | 2.5 | 63.7 | 21.3 | 11.9 | 0.6 |
| 9 | " | 6 | 4 | 8.8 | 10 | " 10 | 11.3 | 2.5 | 52.5 | 17.5 | 11.9 | 0.6 |
| 10 | " | 6 | 4 | 8.8 | 3 | EA 2 | 11.2 | 2.4 | 63.7 | 21.3 | 11.9 | 0.7 |
| 11 | " | 6 | 4 | 8.8 | 6 | " 4 | 11.2 | 2.4 | 60.6 | 20.0 | 11.9 | 0.7 |
| 12 | " | 6 | 4 | 8.8 | 9 | " 6 | 11.2 | 2.4 | 56.3 | 18.7 | 11.9 | 0.7 |

(*1)$\delta P_1$ solubility parameter value in unit (cal/cc)$^{\frac{1}{2}}$ of trunk polymer
(*2)$\delta P_2$ solubility parameter value in unit (cal/cc)$^{\frac{1}{2}}$ of first branch polymer
(*3)$\delta P_3$ solubility parameter value in unit (cal/cc)$^{\frac{1}{2}}$ of second branch polymer
(*4)(*5)$\delta P_2 - \delta P_1$, $\delta P_3 - \delta P_2$ difference in solubility parameter values between trunk polymer and first branch polymer and between first branch polymer and second branch polymer
(1) Part is based on 100 parts of the total monomers of graft polymer.
(2) With regard to monomer, AN: acrylonitrile, MA: methyl acrylate, EA: ethyl acrylate.

The graft polymers respectively having the compositions shown in Table 3 were evaluated for properties under the same conditions as those described in Example 1. The results are shown in Table 4.

Table 4

| | | Properties of graft polymers | | | | |
|---|---|---|---|---|---|---|
| | Example | Izod impact strength(Kg.cm/cm$^2$)(23° C.) | | Thermal | | Degree of grafting |
| | No. | MD11 | MD1 | stability | Odor | (%) |
| Comparison Example | 3 | 2.4 | 2.2 | yellow | offensive | 73 |
| This invention | 4 | 10 | 8.2 | colorless | undetected | 127 |
| " | 5 | 35 | 21 | " | " | 136 |
| " | 6 | 45 | 23 | " | " | 108 |
| " | 7 | 2.3 | 2.1 | " | " | 130 |
| " | 8 | 9.4 | 6.5 | " | " | 69 |
| " | 9 | 63 | 35 | " | " | 158 |
| " | 10 | 12 | 8.8 | " | " | 65 |
| " | 11 | 44 | 27 | " | " | 103 |
| " | 12 | 68 | 54 | " | " | 128 |

The thermal stability was represented in the order of from dark to light, for example, yellow > pale yellow.

EXAMPLE 13

The ingredients indicated below were charged into an autoclave and stirred at a temperature of 40° C. for 46 hours to produce a latex in a yield of 98%.

| (A) | 1,3-butadiene | 30 parts |
|---|---|---|
| | Methyl acrylate | 15 parts |
| | Styrene | 5 parts |
| | tert.-dodecyl mercaptan | 0.25 part |
| | Diisopropylbenzenehydroperoxide | 0.04 part |
| | Rongalit | 0.025 part |
| | Disodium ethylenediaminetetraacetate | 0.0005 part |
| | Sodium dodecylbenzenesulfonate | 0.1 part |
| | Water | 150 parts |

The resultant polymer had a solubility parameter value $\delta$ of 8.8.

(B) Then, to the latex of (A) were added the following ingredients, and the resulting mixture was stirred for 1 hour.

| Sodium dodecylbenzenesulfonate | 0.15 part |
|---|---|
| Water | 100 part |

At the end of that time, the ingredients indicated below were added to the mixture, and the atmosphere within the autoclave was completely displaced with nitrogen, after which the content was stirred at a temperature of 40° C. for 12 hours to produce a latex in a yield of 95%.

| Acrylonitrile | 30 parts |
|---|---|
| Ethyl acrylate | 20 parts |
| n-dodecyl mercaptan | 0.6 part |
| Diisopropylbenzenehydroperoxide | 0.1 part |
| Rongalit | 0.05 part |
| FeSO$_4$ . 7H$_2$O | 0.002 part |
| Disodium ethylenediaminetetraacetate | 0.003 part |
| Water | 50 parts |

The branch polymer of the graft polymer had a solubility parameter value $\delta$ of 11.2.

(C) A second graft polymerization was carried out using the same ingredients and procedures as those described in Example 1.

A graft polymer in the form of a white powder was obtained in a yield of 96%. The second branch polymer of the graft polymer had a solubility parameter value $\delta$ of 11.9.

According to the same conditions as those described in Example 1, the resultant graft polymer was evaluated for various properties. The results are shown in Table 5.

Table 5

| Properties of graft polymer of this invention | | |
|---|---|---|
| Izod impact strength (Kg.cm/cm$^2$) (notched) (23° C.) | MD11 | 51 |
| | MD1 | 31 |
| Thermal stability | colorless | |
| Odor | undetected | |

We claim:
1. A process for producing a graft polymer possessing a low gas-permeability and an excellent impact resistance and thermal stability which comprises the steps of:
first graft-polymerizing in emulsion 5 to 40 parts by weight of (A) a monomeric mixture comprising 30 to 70% by weight of acrylonitrile and 30 to 70% by weight of at least one acrylic ester having the following formula:

$$CH_2=CHCOOR_1$$

wherein $R_1$ represents an alkyl group having from 1 to 4 carbon atoms, in the presence of 2 to 30 parts by weight of (B) a trunk copolymer prepared by copolymerizing 50 to 90% by weight of 1,3-butadiene, 10 to 50% by weight of at least one acrylic or methacrylic ester having the following formula:

$$CH_2=CR_3COOR_2$$

wherein $R_2$ represents an alkyl group having from 1 to 8 carbon atoms and $R_3$ represents a hydrogen atom or a methyl group, and 0 to 15% by weight of styrene to form a first branch polymer; and then graft-polymerizing in emulsion 40 to 90 parts by weight of (C) a monomeric mixture comprising 50 to 85% by weight of acrylonitrile and 15 to 50% by weight of at least one acrylic ester having the following formula:

$$CH_2=CHCOOR_4$$

wherein $R_4$ represents an alkyl group having from 1 to 4 carbon atoms, in the presence of 10 to 60 parts by weight of the first branch polymer prepared in the preceding step, to form a second branch polymer and wherein $$2.3 \leq \delta P_2 - \delta P_1 \leq 2.7$$

$$0.4 \leq \delta P_3 - \delta P_2 \leq 0.8$$

wherein $\delta P_1$, $\delta P_2$ and $\delta P_3$ are solubility parameters of the trunk polymer, the first branch polymer and the second branch polymer, respectively, expressed in terms of $(cal/cc)^{\frac{1}{2}}$.

2. The process according to claim 1 wherein in the monomeric mixture (A) the acrylic ester is methyl acrylate.

3. The process according to claim 1 wherein in the monomeric mixture (A) the acrylic ester is ethyl acrylate.

4. The process according to claim 1 wherein in the copolymer (B) the acrylic ester is methyl acrylate.

5. The process according to claim 1 wherein in the copolymer (B) the methacrylic ester is methyl methacrylate.

6. The process according to claim 1 wherein in the monomeric mixture (C) the acrylic ester is methyl acrylate.

7. The process according to claim 1 wherein the acrylic esters in the monomeric mixtures (A) and (C) are the same and the acrylonitrile content in the monomeric mixture (A) is lower than the acrylonitrile content in the monomeric mixture (C).

* * * * *